Aug. 2, 1960
H. R. TOEWS
2,947,097
SCRAPER BLADE ATTACHMENT FOR A TRACTOR
Filed Feb. 14, 1958
2 Sheets-Sheet 1
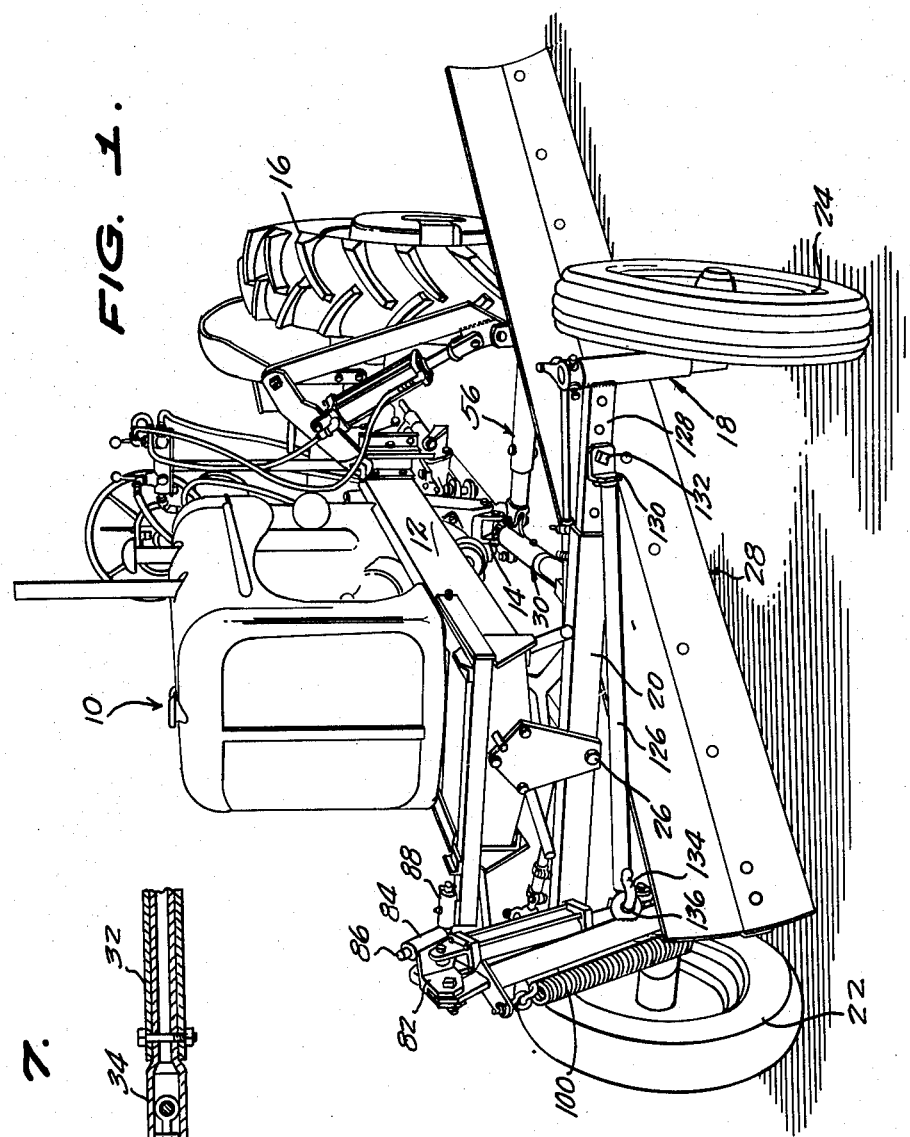
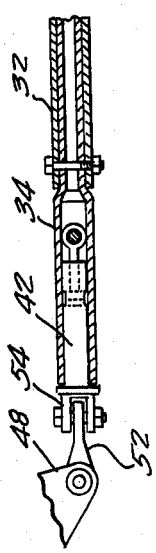
INVENTOR.
HARVEY ROBERT TOEWS,
BY
McMorrow, Berman & Davidson
ATTORNEYS.

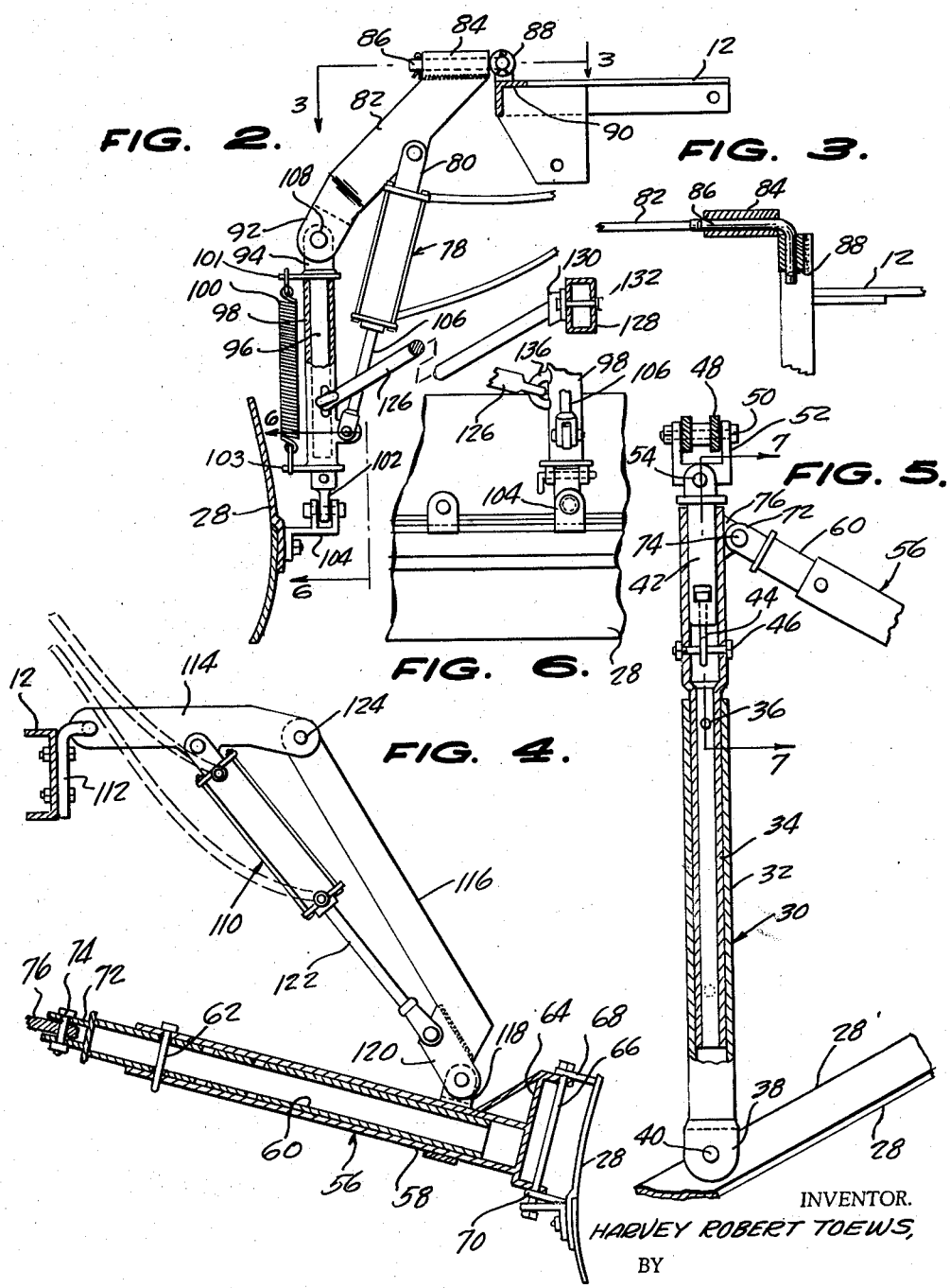

1

2,947,097

SCRAPER BLADE ATTACHMENT FOR A TRACTOR

Harvey Robert Toews, R.F.D. 2, McPherson, Kans.

Filed Feb. 14, 1958, Ser. No. 715,238

2 Claims. (Cl. 37—155)

The present invention relates to a scraper blade attachment for a tractor.

An object of the present invention is to provide a scraper blade which lends itself to ready attachment to and detachment from a tractor, one which may be attached to any tractor having an implement hitch depending from the bed frame thereof, and one which may be adjustable in any desired position beneath the tractor.

Another object of the present invention is to provide a scraper blade for attachment to a tractor which lends itself to efficient snow removal, leveling of farm lands, scraping of farm feed lots, back filling of ditches, digging drainage ditches, constructing terraces and waterways, and other uses scraping and leveling road materials and the like.

A further object of the present invention is to provide a scraper blade attachment for a tractor which is of simple structure, sturdy in construction, and one economically feasible.

These and other objects and advantages of the present invention will be fully apparent from the following description when taken in conjunction with the annexed drawings, in which:

Figure 1 is an isometric view of a tractor with the scraper blade attachment of the present invention installed thereon;

Figure 2 is an elevational view partially in section of the means for effecting the limited up and down movement of the portions of the scraper blade adjacent one end which is forwardly of the axle of the front wheel assembly;

Figure 3 is a sectional view, taken on the line 3—3 of Figure 2;

Figure 4 is an elevational view partially in section of the means for effecting the limited up and down movement of the portion of the scraper blade adjacent the other end which is rearwardly of the axle of the front wheel assembly;

Figure 5 is a plan view partially in section of one of the means for connecting the mid-portion of the scraper blade to the hitch of the tractor for limited up and down movement and for lateral swinging movement of the scraper blade;

Figure 6 is a fragmentary elevational view taken on the line 6—6 of Figure 2; and Figure 7 is a fragmentary sectional view taken on the line 7—7 of Figure 5.

Referring in greater detail to the drawings in which like numerals indicate like parts throughout the several views, a tractor is illustrated in Figure 1 and designated generally by the reference numeral 10 and is seen to have a horizontally disposed bed frame 12 having a forward end and a rearward end. An implement hitch 14 depends from the bed frame 12 at the mid-portion of the latter forwardly of and between the rear wheels 16, only one of which is shown.

A front wheel assembly 18 including an axle 20 and a pair of wheels 22 and 24 carried on opposite ends of the axle 20 is positioned transversely of the frame 12 adjacent the forward end. A horizontally disposed pivot pin 26 extends through the outer sleeve portion 21 of the axle 20 and connects the axle 20 to the frame 12 for rocking movement about the pivot pin 26 as a horizontal axis.

The scraper blade attachment of the present invention includes an upstanding scraper blade 28 positioned beneath the frame 12 intermediate the forward and rearward ends of the latter and arranged so that it extends in a direction diagonally of the frame 12 with one end forwardly of the axle 20 and on one side of the pivot pin 26 and adjacent the front wheel 22. The other end of the blade 28 is on the other side of the pivot pin 26 and extends outwardly of the adjacent side of the frame 12 and forwardly of and nearer the rearward end of the frame 12.

Means is provided connecting the midportion of the blade 28 to the implement hitch 14 for limited up and down movement of the blade 28 and also for lateral swinging limited movement of the blade 28. Specifically, this means embodies a first telescoping member designated generally by the reference numeral 30 and having one end connected to the portion of the blade 28 inwardly of and spaced from the forward end. The other end of the telescoping member 30 is connected to the hitch 14 for limited up and down movement of the blade and for lateral swinging movement of the blade about the hitch 14 as a vertical axis. The telescoping member 30 is shown in detail in Figure 5 and is seen to have an outer sleeve member 32 and an inner sleeve member 34 telescopingly arranged with respect to each other and provided with registering holes, only one being shown as at 36, to which a suitable pin or bolt and nut assembly may be inserted to hold the members 32 and 34 in any selected position of adjustable movement into and out of each other. The end of the outer member 32 remote from the member 34 is bifurcated to provide a clevis, as at 38, for securing by a pin 40 to a web or bracket projecting from the rearward face of the blade 28, the web being designated by the reference numeral 28' and not shown in detail. The end of the inner member 34 is enlarged at its portion which projects exteriorly of the outer member 32 and receives a coupling pin 42 with a conventional toggle bolt and locking bolt as at 44 and 46, respectively, securing such coupling pin 42 within the open end of the inner member 34.

In Figure 5 the reference numeral 48 represents the bifurcated portion of the hitch 14. A horizontally disposed bolt and nut assembly 50 extends through the portion 48 and also through the legs of a U-shaped coupling element 52 which has its bight secured by a vertical bolt and nut assembly as at 54 the latter extending through the bifurcated end portion of the coupling pin 42 and forming the means of connection of the telescoping member 30 to the hitch 14.

The invention includes a means for effecting limited up and down movement of the portion of the scraper blade 28 adjacent the other end which is rearwardly of the axle 20 of the front wheel assembly 18. This means, Figure 4, comprises another telescoping member designated generally by the reference numeral 56 and includes an outer member 58 and an inner member 60 telescopingly arranged together and held in any position of their adjusted movement by a pin 62 which extends through any pair of registering holes provided in the members 58 and 60, securing such members in any selected position of extensile or retractile movement with respect to each other. A U-shaped bracket 64 is secured to the end of the outer member 58 remote from the pin 62 and a pivot pin 66 extends through the legs of such bracket 64 and through suitably spaced projection lugs 68 and 70 carried on the rearward face of the blade 28. The projecting end portion of the inner member 60 is bifurcated as at 72 in Figures 4 and 5 and receives therethrough a pin 74 also extending through an apertured lug 76 projecting from the side of the enlarged portion of the first telescoping member inner member 34 inwardly of and adjacent the end of such telescoping member 30 where it is connected to the bifurcated portion 48 of the hitch 14. Also, as the inner and outer members of the telescoping member 56 are shifted with respect to each other and the inner and outer members of the telescoping member 30 are shifted with respect to each other, there will be swinging movement of the members 30 and 56 toward and away from each other.

Means is provided for effecting limited up and down movement of the portion of the scraper blade 28 adjacent one end which is forwardly of the axle 20 of the front wheel assembly. Such means, as shown in Figure 2, comprises a hydraulic cylinder assembly 78 having its projecting base portion 80 bifurcated and pivotally connected to the midportion of an arm 82 which has a sleeve 84 on its upper end circumposed about one leg of an L-shaped pin 86. The other leg of the pin 86 is received within a horizontally disposed sleeve 88 fixedly secured by welding or other conventional means on the upper horizontally disposed leg of a forward frame member 90 forming a part of the tractor frame 12. The lower end portion of the arm 82 is bifurcated, as at 92, and receives the upper projecting lug 94 on the upper end of a vertically disposed positioning bar 96. A housing 98 surrounds the bar 96 and is slidable downwardly and upwardly thereover and is biased to its upward position by means of a coil spring 100 which has its ends secured to projections 101 and 103 on the lug 94 and on the lower end portion of the housing 98, respectively. The housing 98 has a coupling 102 on its lower end received between the arms of a bracket 104 which is fixedly secured to the rearward face of the blade 28 inwardly of and adjacent the end which projects beyond the axle 20 of the tractor 10.

Fluid introduced into the hydraulic cylinder assembly 78 through its ends effects the contractile and extensile movement of the actuating arm 106 and results in pivotal movement of the arm 82 with respect to the bar 96 about the connecting pin 108 as a horizontal axis, this movement resulting in raising and lowering of the forward end of the blade 28 into and out of engagement with the ground surface to be scraped.

A similar arrangement of a hydraulic cylinder assembly 110 is provided for the portion of the blade 28 inwardly of and spaced from the rearward end and adjacent to the midportion of such blade 28. This is shown in Figure 4 in which the frame 12 has a bracket 112 secured to the exterior thereof and an upper arm 114 pivotally connected to the bracket 112 for movement about a horizontal axis. An upwardly sloping second arm 116 has its upper end pivotally connected to the arm 114 and its lower end pivotally connected to the outer member 58 of the telescoping member 56 adjacent its point of attachment to the bracket 64, there being provided an upwardly extending lug 118 receiving the bifurcated attached portion 120 which forms an extension of the lower end of the arm 116. Introduction of hydraulic fluid under pressure into the end of the hydraulic cylinder assembly 110 effects the extensile and retractile movements of the actuating arm 122 in the conventional manner to move the arms 114 and 116 about their pivotal connection pin 124 in such a way as to lower and raise the blade 28 either independently of or with the raising and lowering of the forward portion of the blade by the actuation of the hydraulic cylinder assembly 78. It is to be understood that the coupling of the bifurcated portion 72 of the inner member 60 of the telescoping member 56 with the lug 76 carried by the first telescoping member 30 is loose enough to permit raising and lowering of the portion of the blade 28 adjacent the rearward end thereof for limited distances without raising or lowering the major or forward portion of the blade 28. Actuation of the cylinders 78 and 110 together will effect the raising of the blade 28 along is entire length.

An important feature of the present invention resides in a brace member 126 shown in Figures 1 and 2 and which is arranged forwardly of the axle 20 and has one end pivotally connected to the extending portion 128 of the axle 20, there being a bracket 130 of L-shaped configuration having one end or one leg fastened securely to one end of the brace member 126 and having a hole through the other end or leg through which extends a bolt and nut assembly 132 permitting limited swinging upward and downward movement of the brace member 126 about the bolt and nut assembly 132 as a horizontal axis. The other end of the brace member 126 is provided with a coupling element 134 securing it to a projecting lug 136 carried by the side of the housing 98 intermediate the ends of the latter. The brace member 126 may be adjusted relative to the extended portion of the axle 20 to thereby position the forward end portion of the blade 28 toward or away from the wheel 22 and to change the position of the forward end of the blade 28 relative to the arm 82 which swings about the pin 86 as an axis and also swings upwardly or downwardly by reason of the connection of the sleeve 88 and the other portion of the pin 86.

In use, either or both of the hydraulic cylinder assemblies 78 and 110 may be actuated to raise or lower the adjacent portion of the blade 28 and the telescoping members 30 and 56 may be adjusted to position the blade 28 in any desired angular position beneath the tractor 10. The spring 100 holds the forward end portion of the blade 28 at the position determined by the extension or retraction of the actuating arm 106 of the hydraulic cylinder assembly 78 and by its extension, should the blade 28 be caught upon an obstacle, saves the cylinder assembly 78 and the adjacent arm 82 and the housing 98 from shock and damage.

While only a preferred embodiment of the present invention has been shown and described, other embodiments are contemplated and numerous changes and modifications may be made therein without departing from the spirit of the invention as set forth in the appended claims.

What is claimed is:

1. The combination with a tractor bed frame having a forward end and a rearward end, a front wheel assembly including an axle and a pair of wheels carried by opposite ends of said axle positioned transversely of said bed frame adjacent the forward end and having the axle connected intermediate its ends to the forward end of said frame for rocking movement about a horizontal axis, and an implement hitch dependingly carried by the midportion of said bed frame, of an upstanding scraper blade positioned beneath said frame intermediate the ends so that it extends in a direction diagonally of said frame with one of the ends forwardly of said axle and on one side of said axis and adjacent one of the front wheels and the other of its ends on the other side of said axis and outwardly of the adjacent side of said frame and forwardly of and near the rearward end of said frame, a first telescoping member having one end connected to the portion of said blade inwardly of and spaced from said one end thereof and having the other end connected to said hitch for limited up and down movement of said blade portion and for lateral swinging movement of said blade about said hitch as a vertical axis, a second telescoping member extending diagonally between the portion of said blade inwardly of and spaced from said blade other end and said first telescoping member inwardly of and adjacent said first telescoping member other end, and having one end pivotally secured to the last-named blade portion and having the other end pivotally connected to said first member for pivotal movement about another vertical axis, means operatively connected to said blade adjacent said one end thereof for effecting the limited up and down movement of the portion of said blade adjacent said one end thereof, and means operatively connected to said blade adjacent the other end thereof for effecting the limited up and down movement of the portion of said blade adjacent the other end thereof.

2. The combination with a tractor bed frame having a forward end and a rearward end, a front wheel assembly including an axle and a pair of wheels carried by opposite ends of said axle positioned transversely of said bed frame adjacent the forward end and having the axle connected intermediate its ends to the forward end of said frame for rocking movement about a horizontal axis, and an implement hitch dependingly carried by the midportion of said bed frame, of an upstanding scraper blade positioned beneath said frame intermediate the ends so that it extends in a direction diagonally of said frame with one of the ends forwardly of said axle and on one side of said axis and adjacent one of the front wheels and the other of its ends on the other side of said axis and outwardly of the adjacent side of said frame and forwardly of and near the rearward end of said frame, a first telescoping member having one end connected to the portion of said blade inwardly of and spaced from said one end thereof and having the other end connected to said hitch for limited up and down movement of said blade portion and for lateral swinging movement of said blade about said hitch as a vertical axis, a second telescoping member extending diagonally between the portion of said blade inwardly of and spaced from said blade other end and said first telescoping member inwardly of and adjacent said first telescoping member other end, and having one end pivotally secured to the last-named blade portion and having the other end pivotally connected to said first member for pivotal movement about another vertical axis, means operatively connected to said blade adjacent said one end thereof for effecting the limited up and down movement of the portion of said blade adjacent said one end thereof, means operatively connected to said blade adjacent the other end thereof for effecting the limited up and down movements of the portion of said blade adjacent the other end thereof, and a brace member arranged forwardly of said axle and having one end pivotally connected to said axle inwardly of and adjacent the other of said wheels and having the other end pivotally connected to said first-named means.

References Cited in the file of this patent

UNITED STATES PATENTS

| | | |
|---|---|---|
| 191,287 | Jefferson | May 29, 1877 |
| 321,193 | Cook | June 30, 1885 |
| 1,492,120 | Calabrese | Apr. 29, 1924 |
| 2,229,210 | Kerber | Jan. 21, 1941 |
| 2,313,342 | Hoover | Mar. 9, 1943 |
| 2,321,833 | Lull | June 15, 1943 |
| 2,337,104 | Hermsmeyer | Dec. 21, 1943 |